(12) United States Patent
Rubanovich et al.

(10) Patent No.: US 9,274,752 B2
(45) Date of Patent: Mar. 1, 2016

(54) LEADING CHANGE ANTICIPATOR LOGIC

(71) Applicant: Intel Corporation, Santa Clara, CA (US)

(72) Inventors: Simon Rubanovich, Haifa (IL); Thierry Pons, Hadera (IL); Amit Gradstein, Binyamina (IL); Zeev Sperber, Zichron Yackov (IL)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 13/729,421

(22) Filed: Dec. 28, 2012

(65) Prior Publication Data

US 2014/0188967 A1 Jul. 3, 2014

(51) Int. Cl.
*G06F 7/74* (2006.01)
*G06F 5/01* (2006.01)
*G06F 7/485* (2006.01)

(52) U.S. Cl.
CPC *G06F 7/74* (2013.01); *G06F 5/012* (2013.01); *G06F 7/485* (2013.01)

(58) Field of Classification Search
None
See application file for complete search history.

(56) References Cited

U.S. PATENT DOCUMENTS

| 5,751,621 | A | * | 5/1998 | Arakawa | 708/501 |
| 6,078,941 | A | * | 6/2000 | Jiang et al. | 708/625 |
| 6,405,232 | B1 | | 6/2002 | Green et al. | |
| 6,820,106 | B1 | | 11/2004 | Vijayrao et al. | |
| 8,214,417 | B2 | | 7/2012 | Ahmed | |
| 2003/0212726 | A1 | * | 11/2003 | Luick | 708/501 |
| 2010/0174891 | A1 | | 7/2010 | Nomoto | |

OTHER PUBLICATIONS

International Searching Authority, "Notification of Transmittal of the International Search Report and the Written Opinion of the International Searching Authority," mailed Sep. 27, 2013, in International application No. PCT/US2013/048084.
International Searching Authority, "International Preliminary Report on Patentability," issued Jun. 30, 2015, in International application No. PCT/US2013/048084.

* cited by examiner

*Primary Examiner* — Michael D Yaary
(74) *Attorney, Agent, or Firm* — Trop, Pruner & Hu, P.C.

(57) ABSTRACT

In one embodiment, a processor includes at least one floating point unit. The at least one floating point unit may include an adder, leading change anticipator (LCA) logic, and a shifter. The adder may be to add a first operand X and a second operand Y to obtain an output operand having a bit length n. The LCA logic may be to: for each bit position i from n−1 to 1, obtain a set of propagation values and a set of bit values based on the first operand X and the second operand Y; and generate a LCA mask based on the set of propagation values and the set of bit values. The shifter may be to normalize the output operand based on the LCA mask. Other embodiments are described and claimed.

23 Claims, 9 Drawing Sheets

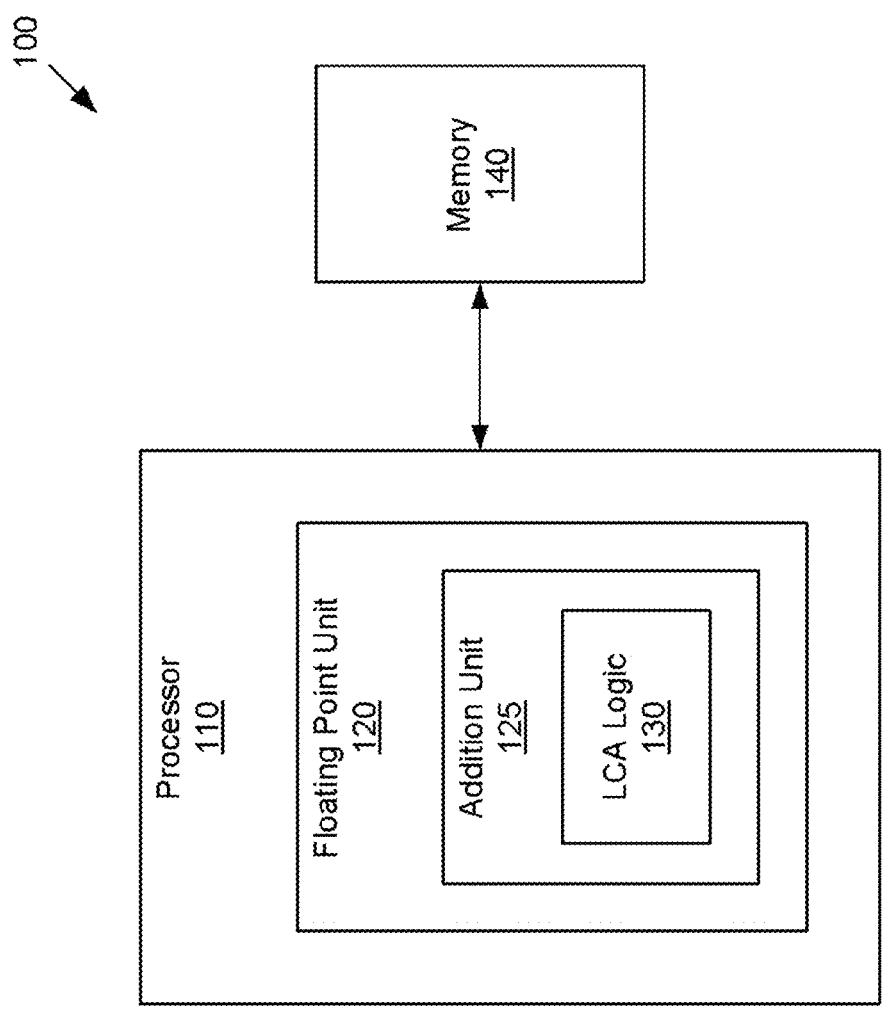

LEADING CHANGE ANTICIPATOR LOGIC

BACKGROUND

Embodiments relate generally to floating point operations.

Modern processors include various circuitry for performing operations on data. This circuitry may include a Floating Point Unit (FPU), which may include functionality to carry out operations on floating point numbers. For example, floating point operations may include addition, subtraction, multiplication, division, and square root. Such floating point operations may be heavily used in certain applications such as graphics, games, science, and engineering applications.

BRIEF DESCRIPTION OF THE DRAWINGS

FIGS. 1A-1B are block diagrams of systems in accordance with one or more embodiments.

DETAILED DESCRIPTION

Figure 1B:
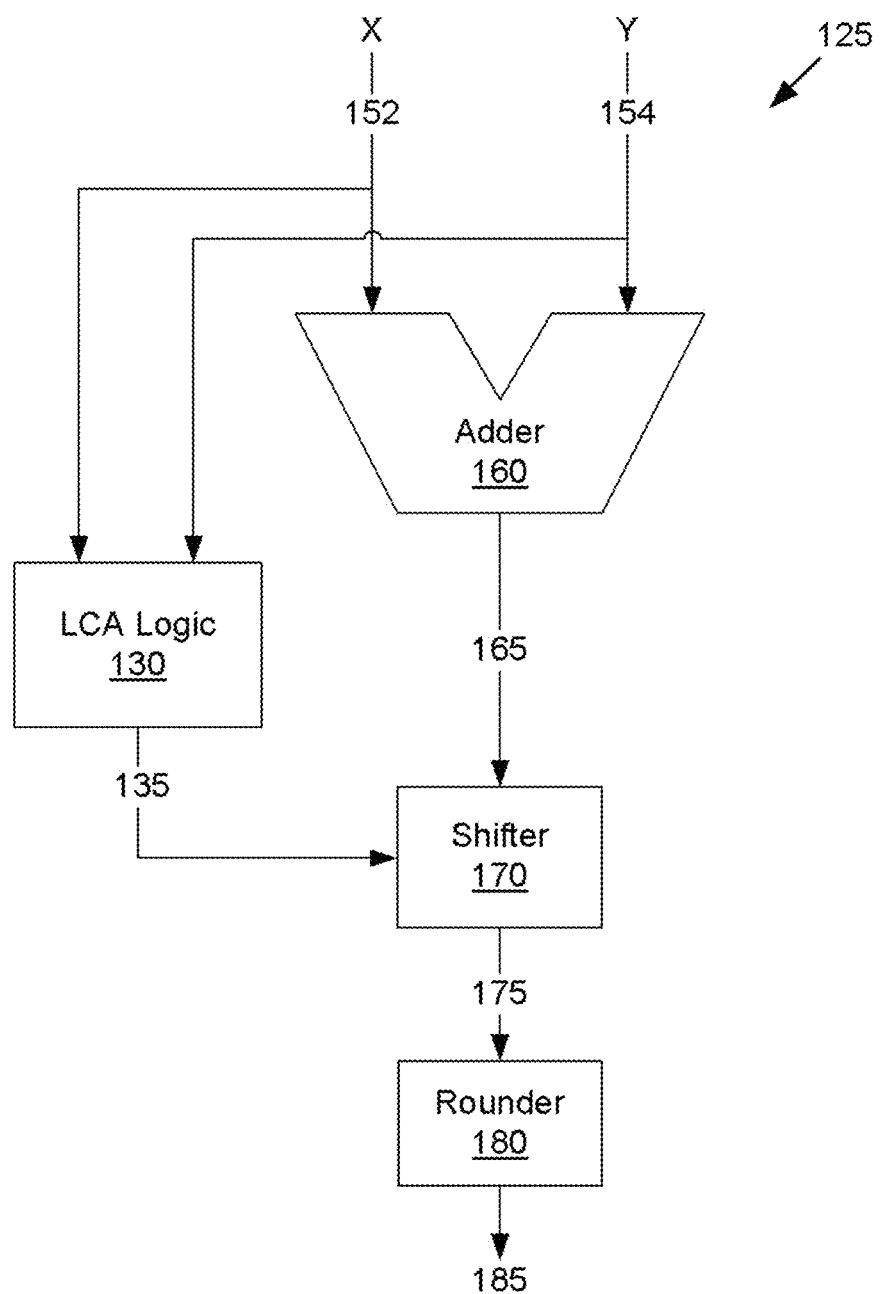

Generally, a Floating Point Unit (FPU) may represent a floating point number using three elements, namely a binary sign bit, a binary encoded exponent, and a binary encoded mantissa. In addition-like operations, the mantissas may be shifted to align the exponents. As used herein, the terms "addition-like" and "add-like" operations include, in addition to an addition operation, a subtraction operation, a minimum function, a maximum function and others such as integer-to-floating point, and floating point-to-integer conversions, as well as double-to-single precision and single-to-double precision conversions, and floating point compare instructions.

In some cases, a mantissa produced by an addition-like operation may include leading zeros (in the case of a positive result) or leading ones (in the case of a negative result). Conventionally, a Leading Zeros Anticipator (LZA) may be used in parallel with an adder to anticipate a number of leading zeros in the output mantissa of the adder. This number of leading zeros may be provided to a shifter, which may then shift the output mantissa to remove any leading zeros. Similarly, a Leading Ones Anticipator (LOA) may anticipate a number of leading ones, and may thus be used with a shifter to remove any leading ones from the output mantissa. Such removal of leading ones or zeroes may be referred to as "normalizing" the output mantissa.

Because such LZA and the LOA are conventionally implemented as separate circuits, detecting both leading ones and leading zeroes may require a significant amount of available processor resources (e.g., area on a processor die). Further, a selector may be required to determine which of the LZA or the LOA to use for each operation. Furthermore, the LZA, LOA, and/or the selector may introduce a time delay to completing the floating point operation, thereby degrading the processor performance.

In accordance with some embodiments, a Leading Anticipator Change (LCA) may be provided. In one or more embodiments, the LCA may be a single circuit to anticipate both leading ones and zeros in an output of an addition-like floating point operation, and may be used to normalize such an output. In some embodiments, the LCA may consume fewer processor resources than other techniques (e.g., LZA, LOA, and selector). Further, the LCA may provide leading zero/one anticipation without introducing a time delay to the floating point operation, thereby improving processor performance.

Referring to FIG. 1A, shown is a block diagram of a system 100 in accordance with one or more embodiments. In some embodiments, the system 100 may be all or a portion of an electronic device or component. For example, the system 100 may be included in a cellular telephone, a computer, a server, a network device, a processor, a system on a chip (SoC), a controller, a wireless transceiver, a power supply unit, etc.

As shown in FIG. 1A, the system 100 may include a processor 110 coupled to a memory 140. The processor 110 may include a Floating Point Unit (FPU) 120. In some embodiments, the FPU 120 may include functionality to perform floating point operations (e.g., addition, subtraction, multiplication, division, etc.).

While the scope of the present invention is not limited in this regard, in many implementations the FPU 120 may be compliant for operands of a given format or standard (e.g., a given Institute of Electrical and Electronics Engineers (IEEE) standard). Further, a given implementation may be used to handle various types of incoming data, including operands that can be of single and double precision floating point format.

As shown, the FPU 120 may include an addition unit 125. In some embodiments, the addition unit 125 may represent any unit(s) including functionality to perform addition-like floating point operations. For example, the addition unit 125 may be an adder. In another example, the addition unit 125 may be a Fused Multiply-Add (FMA) unit including a multiplier, an adder, and a rounder. An example embodiment of the addition unit 125 is discussed below with reference to FIG. 1B.

In embodiments in which the addition unit 125 is a FMA unit, this FMA unit may perform floating-point multiply accumulate operations and be compliant for operands of a given format, e.g., of a given Institute of Electrical and Electronics Engineers (IEEE) standard such as the IEEE standard 754-2008 (published 2008) for floating point (FP) arithmetic. Furthermore, a given implementation may be used to handle various types of incoming data, including operands that can be of single and double precision floating point format.

In some embodiments, FMA instruction syntax can be defined using three source operands, where the first source operand is updated based on the result of the arithmetic operations of the data elements. As such, the first source operand may also be the destination operand. For example, an instruction format of: opcode, x1, x2, x3 may be present, where the opcode corresponds to one of multiple user-level FMA or other instructions to perform a given arithmetic operation, and x1-x3 correspond to operands to be processed in the operation.

An arithmetic FMA operation performed in an FMA instruction can take one of several forms, e.g.:

$r=(x*y)+z;$ $r=(x*y)-z;$ $r=-(x*y)+z;$ or $r=-(x*y)-z.$

In an embodiment, packed FMA instructions can perform eight single-precision FMA operations or four double-precision FMA operations with 256-bit vectors. Scalar FMA instructions may only perform one arithmetic operation on a low order data element, when implemented using vector registers. The content of the rest of the data elements in the lower 128-bits of the destination operand is preserved, while the upper 128 bits of the destination operand may be filled with zero.

In an embodiment, an arithmetic FMA operation of the form, r=(x*y)+z, takes two IEEE-754-2008 single (double) precision values and multiplies them to form an intermediate value. This intermediate value is added to a third single (double) precision value and rounded to produce a single (double) precision result. Different rounding modes and precisions may be implemented in different embodiments.

In one embodiment, vector instructions can be executed on various packed data type representations. These data types may include a packed byte, a packed word, and a packed doubleword (dword) and a packed quadword for 128 bits wide operands. As an example, a packed byte format can be 128 bits long and contain sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Understand however that embodiments apply equally to scalar (individual or non-packed) representations.

Generally, a data element is an individual piece of data that is stored in a single register or memory location with other data elements of the same length. In some packed data sequences, the number of data elements stored in a register can be 128 bits divided by the length in bits of an individual data element. Although the data types can be 128 bit long, embodiments of the present invention can also operate with 64 bit wide or other sized operands.

It will be appreciated that packed data formats may be further extended to other register lengths, for example, to 96-bits, 160-bits, 192-bits, 224-bits, 256-bits or more. In addition, various signed and unsigned packed data type representations can be handled in multimedia registers according to one embodiment of the present invention. And scalar data formats of various types also may be handled in registers of a register file in accordance with an embodiment of the present invention.

In one or more embodiments, the addition unit 125 may be include a Leading Anticipator Change (LCA) logic 130. In some embodiments, the LCA logic 130 may include functionality to anticipate leading ones or zeroes in a mantissa resulting from an addition-like operation performed in the FPU 120. Further, in some embodiments, the anticipated leading ones or zeroes provided by the LCA logic 130 may be used to normalize a result of the addition-like operation. The functionality of the LCA logic 130 is described further below with reference to FIGS. 1B, 2, and 3.

Note that the system 100, the processor 110, the FPU 120, the addition unit 125, and/or the LCA logic 130 are shown in simplified form, and may include any number or type of elements in addition to those shown in FIG. 1A. For example, the processor 110 may also include an integer unit (not shown).

Referring now to FIG. 1B, shown is an example embodiment of the addition unit 125. As shown, the addition unit 125 may include an adder 160, the LCA unit 130, a shifter 170, and a rounder 180. In one or more embodiments, the adder 160 may add mantissa X 152 and mantissa Y 152 to obtain an output mantissa 165 (i.e., X+Y). The adder 160 may then provide the output mantissa 165 to the shifter 170.

As shown, the mantissa X 152 and the mantissa Y 154 may be provided to the LCA logic 130 and to the adder 160. In some embodiments, the LCA logic 130 may determine, based on the mantissa X 152 and the mantissa Y 154, the most significant bit (MSB), meaning the highest bit in the output mantissa 165 after removing any leading ones or zeros. Further, in some embodiments, the position of the MSB may be used to determine the number of leading ones or zeros (referred to herein as the "shift number") anticipated to be included in the output mantissa 165. Note that, in some cases, the shift number may be equal to zero, meaning that no leading ones or zeros are anticipated to be included in the output mantissa 165.

As shown in FIG. 1B, the LCA logic 130 may provide a LCA mask 135 to the shifter 170. In some embodiments, the LCA mask 135 may be a bit mask including bits corresponding to the bit positions in the output mantissa 165. In particular, in some embodiments, the LCA mask 135 may include "1" bits in the bit positions of each leading one or zero in the output mantissa 165, and may also include a "0" bit in the bit position of the position of the MSB in the output mantissa 165.

In one or more embodiments, the LCA logic 130 may generate the LCA mask 135 as a series of mask bits. In some embodiments, a mask bit corresponding to bit position i may be generated according to a mask bit formula mb[i]. The mask bit formula mb[i] may be derived as follows.

The mantissa X 152 is a bit vector including bits X[n], X[n−1], . . . , X[1], X[0].

The mantissa Y 154 is a bit vector including bits Y[n], Y[n−1], . . . , Y[1], Y[0].

For each bit position i, we derive a propagation value P, a kill value Z, and a generate value G, where:

$$P[i]=(X[i]<>Y[i]),$$

$$Z[i]=(X[i]=Y[i]=0), \text{ and}$$

$$G[i]=(X[i]=Y[i]=1).$$

These values may be related by: !P[i−1]=Z[i]+G[i].

The next step is detecting the first violation (with maximal index) of the following cases:

for leading zeros—P[n] . . . P[i+1]G[i]Z[i−1] . . . Z[0], and for leading ones—P[n] . . . P[i+1]Z[i]G[i−1] . . . G[0].

The initial mask bit formula for i=n−1, . . . , 1 may be formulated as:

$$mb[i]=P[i] \text{ OR } (P[i+1] \text{ AND } ((Z[i] \text{ AND } G[i-1]) \text{ OR } (G[i] \text{ AND } Z[i-1]))) \text{ OR } (!P[i+1] \text{ AND } ((Z[i] \text{ AND } Z[i-1]) \text{ OR } (G[i] \text{ AND } G[i-1]))).$$

This initial mask bit formula may be transformed as:

$$mb[i]=P[i] \text{ OR } (!P[i] \text{ AND } ((Z[i] \text{ AND } G[i-1]) \text{ OR } (G[i] \text{ AND } Z[i-1])))) \text{ OR } (!P[i+1] \text{ AND } (!P[i] \text{ AND } ((Z[i] \text{ AND } Z[i-1]) \text{ OR } (G[i] \text{ AND } G[i-1])))).$$

A first expression may be simplified:

$$!P[i] \text{ AND } ((Z[i] \text{ AND } G[i-1]) \text{ OR } (G[i] \text{ AND } Z[i-1]))=$$

$$!P[i] \text{ AND } !P[i-1] \text{ AND } ((Z[i] \text{ AND } G[i-1]) \text{ OR } (G[i] \text{ AND } Z[i-1]))=$$

$$!P[i] \text{ AND } !P[i-1] \text{ AND } (X[i]<>X[i-1]).$$

Similarly, a second expression may be simplified:

$!P[i]$ AND $((Z[i]$ AND $Z[i-1])$ OR $(G[i]$ AND $G[i-1]))=$ $!P[i]$ AND $!P[i-1]$ AND $((Z[i]$ AND $Z[i-1])$ OR $(G[i]$ AND $G[i-1]))=$ $!P[i]$ AND $!P[i-1]$ AND $(X[i]=X[i-1])$.

These two simplified expressions may be substituted into the mask bit formula:

$mb[i]=P[i]$ OR $(P[i]$ AND $!P[i]$ AND $!P[i-1]$ AND $(X[i]<>X[i-1]))$ OR $(!P[i]$ AND $!P[i-1]$ AND $(X[i]=X[i-1]))$.

This formula may be simplified:

$mb[i]=P[i]$ OR $(P[i+1]$ AND $!P[i-1]$ AND $(X[i]<>X[i-1]))$ OR $(!P[i+1]$ AND $!P[i-1]$ AND $(X[i]=X[i-1]))$.

This formula may also be simplified:

$mb[i]=P[i]$ OR $!P[i-1]$ AND $((P[i+1]$ AND $(X[i]<>X[i-1]))$ OR $(!P[i+1]$ AND $(X[i]=X[i-1])))$.

This formula may be transformed into the final form of the mask bit formula:

$mb[i]=P[i]$ OR $!P[i-1]$ AND $(P[i+1]$ XOR $(X[i]$ XNOR $X[i-1]))$.

In one or more embodiments, the LCA logic 130 may implement this mask bit formula as a logic circuit. One example embodiment of such a logic circuit is described below with reference to FIG. 2.

In one or more embodiments, the shifter 170 may use the LCA mask 135 to determine the shift number. The shifter 170 may also bit shift the output mantissa 165 to the left by the shift number, thus normalizing (i.e., removing any leading ones or zeros from) the output mantissa 165 to obtain the normalized output 175. The shifter 170 may then provide the normalized output 175 to the rounder 180. The rounder 180 may perform a rounding operation, and may provide a rounded output 185.

Note that the LCA logic 130 may operate in parallel to the adder 160. As such, the LCA logic 130 may provide the LCA mask 135 without first waiting for the adder 160 to finish adding the mantissa X 152 and the mantissa Y 154. In this manner, the addition unit 125 may complete the addition operation faster than would be possible if the LCA logic 130 did not operate in parallel to the adder 160. Example embodiments of the LCA logic 130 and the adder 160 are discussed below with reference to FIG. 2.

Figure 2:
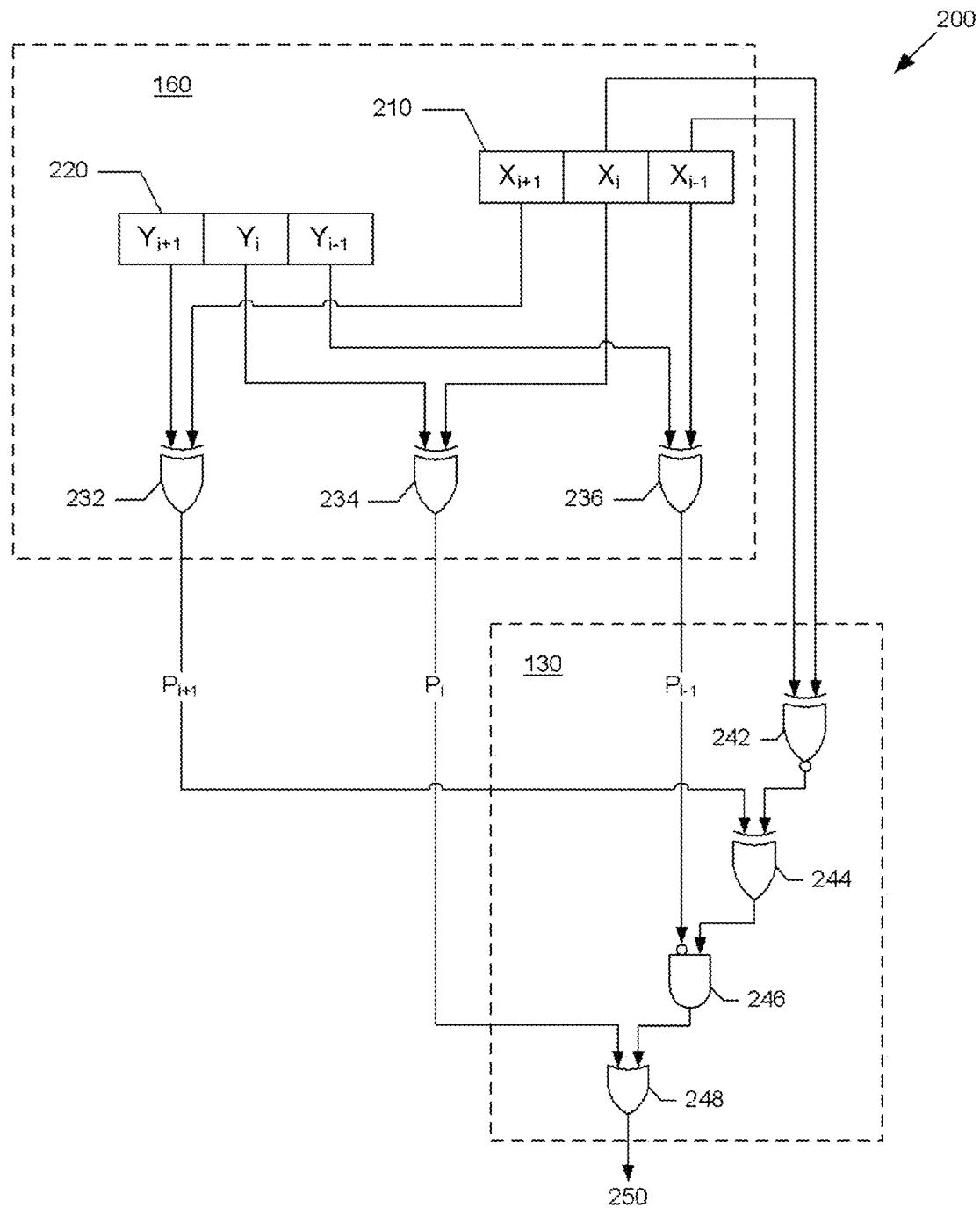
FIG. 2 is a block diagram in accordance with one or more embodiments.

Referring now to FIG. 2, shown is a block diagram of a LCA logic 130 and an adder 160 in accordance with one or more embodiments. In particular, FIG. 2 shows an example in which the adder 160 is to add a first mantissa 210 (including bits $X_0, X_1, \ldots, X_n$) and a second mantissa 220 (including bits $Y_0, Y_1, \ldots, Y_n$), each including n+1 bits. Assume that the LCA logic 130 is to iterate through bit positions i=n−1 to 1 (i.e., from the second highest position n−1 to the second-lowest position 1) in order to determine the position of the MSB. As such, assume that the example shown in FIG. 2 corresponds to a point in time at which the LCA logic 130 is evaluating the bit position i.

In one or more embodiments, the adder 160 includes a first exclusive-OR (XOR) gate 232, a second XOR gate 234, and a third XOR gate 236. As shown, the second XOR gate 234 may receive a bit $X_i$ (corresponding to bit position i in the first mantissa 210) and a bit $Y_i$ (corresponding to bit position i in the second mantissa 220). The output $P_i$ of the second XOR gate 234 may thus correspond to the value ($X_i$ XOR $Y_i$). The output $P_i$ may be referred to herein as the "propagation" value corresponding to bit position i. In a similar fashion, the first XOR gate 232 may receive bits $X_{i+1}$ and $Y_{i+1}$, and may provide the propagation value $P_{i+1}$, corresponding to the value ($X_{1+1}$ XOR $Y_{i-1}$). Further, the third XOR gate 236 may receive bits $X_{i-1}$ and $Y_{i-1}$, and may provide the propagation value $P_{i-1}$, corresponding to the value ($X_{i-1}$ XOR $Y_{i-1}$).

In one or more embodiments, the LCA logic 130 may implement the mask bit (mb) formula described above. As shown, in some embodiments, the LCA logic 130 includes an exclusive-NOR (XNOR) gate 242, a fourth XOR gate 244, an AND gate 246, and an OR gate 248. As shown in FIG. 2, the XNOR gate 242 may receive bits $X_i$ and $X_{i-1}$ as inputs. The fourth XOR gate 244 may receive the output of the XNOR gate 242 and propagation value $P_{i+1}$ as inputs. The AND gate 246 may receive the output of the fourth XOR gate 244 and an inverse of the propagation value $P_{i-1}$ as inputs. The OR gate 248 may receive the output of the AND gate 246 and the propagation value $P_i$ as inputs.

In some embodiments, the output 250 of the OR gate 248 may be a bit indicating whether the current bit position i in the output mantissa (i.e., the sum of mantissas X and Y) is a leading one or zero. Specifically, in some embodiments, the output 250 may be a one bit when the bit position i is a leading one or zero, and may be a zero bit when the bit position i is the most significant bit.

In one or more embodiments, the output 250 at bit position i may be considered to be a mask bit, meaning one bit in a LCA mask composed of n−2 bits. Stated differently, as bit position i iterates from n−1 to 1, the output 250 may form a LCA mask (e.g., LCA mask 135 shown in FIG. 1B) in which the highest zero bit indicates the most significant bit in the output mantissa. This LCA mask may then be provided to a shifter (e.g., shifter 170 shown in FIG. 1B) for use in normalizing the output mantissa. Note that the example of FIG. 2 is not intended to be limiting, and other embodiments are contemplated. For example, in some embodiments of the LCA logic 130, the AND gate 246 and the OR gate 248 may be replaced by a single compound or combination logic gate (e.g., an AND-OR-Invert gate).

Figure 3:
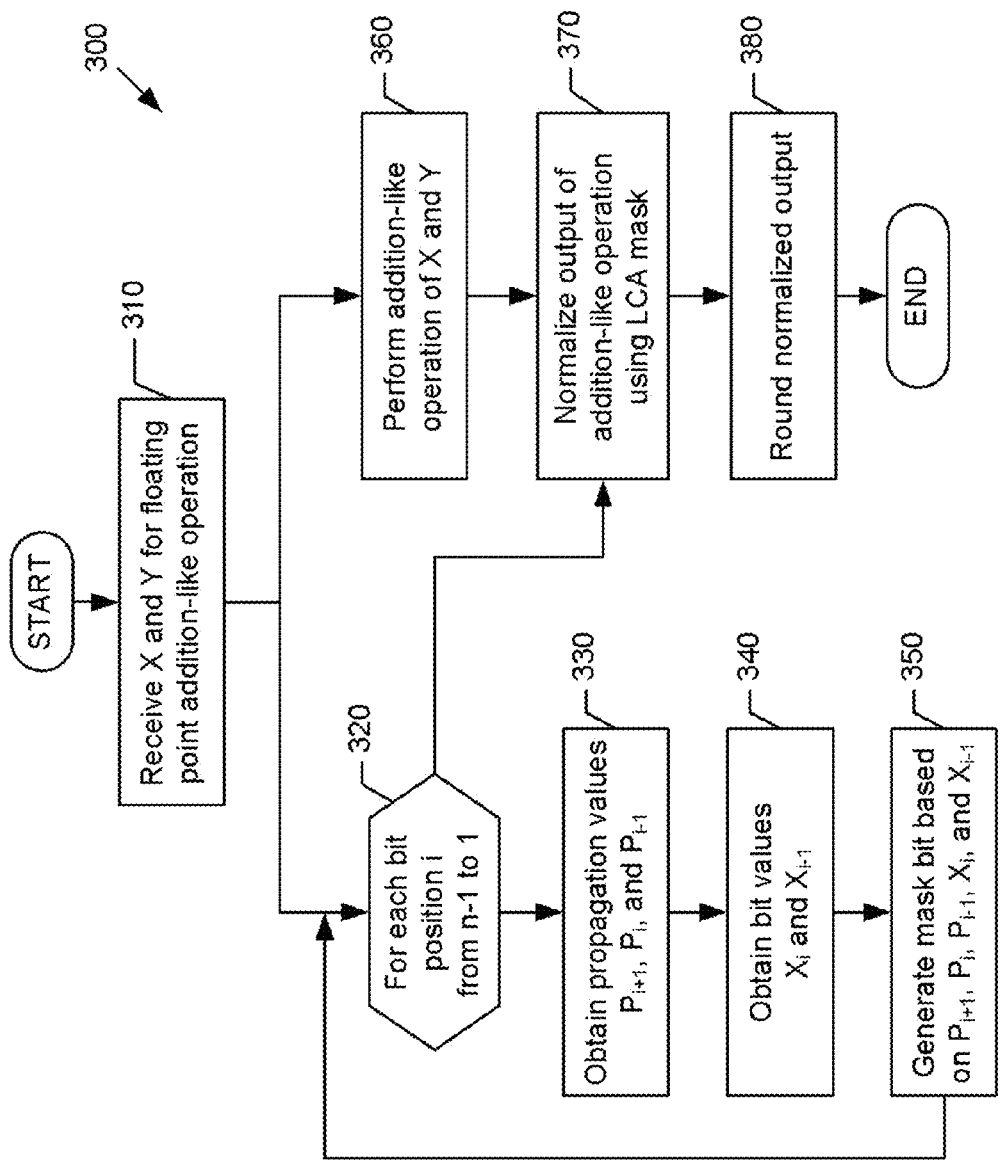
FIG. 3 is a sequence in accordance with one or more embodiments.

Referring now to FIG. 3, shown is a sequence 300 for normalizing an addition operation, in accordance with one or more embodiments. In one or more embodiments, the sequence 300 may be part of the addition unit 125 and/or the LCA logic 130 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, bit vectors X and Y may be received for a floating point addition-like operation. For example, referring to FIGS. 1A-1B, the addition unit 125 may receive the mantissa X 152 and the mantissa Y 154, each having a bit length n, to be added using a floating point ADD operation.

At step 360, the floating point addition-like operation of bit vectors X and Y may be performed. For example, referring to FIG. 1B, the adder 160 may perform a floating point ADD operation of the mantissa X 152 and the mantissa Y 154 to obtain an output mantissa 165.

At step 320, a loop (defined by steps 320, 330, 340, and 350) may be entered to process bit positions i included in the bit vectors X and Y. Specifically, in some embodiments, this loop may process the bit positions i from n−1 to 1. For example, referring to FIG. 1B, the LCA logic 130 may iterate through bit positions i=n−1 to 1 of the mantissa X 152 and the mantissa Y 154. Note that, in some embodiments, the loop entered at step 320 occurs in parallel to the step 360 described above.

At step 330, the propagation values $P_{i+i}$, $P_i$, and $P_{i-1}$, may be obtained. For example, referring to FIG. 2, the LCA logic 130 may obtain the propagation value $P_{i+1}$ from the first XOR gate 232 included in the adder 160. In some embodiments, the propagation value $P_{i+1}$ may correspond to the value ($X_{i+1}$ XOR $Y_{i+1}$). Further, the LCA logic 130 may obtain the propagation value $P_i$ from the second XOR gate 234 included in the adder 160. The propagation value $P_i$ may correspond to the value ($X_i$ XOR $Y_i$). In addition, the LCA logic 130 may obtain the propagation value $P_{i-1}$ from the third XOR gate 236. In some embodiments, the propagation value $P_{i-1}$ may correspond to the value ($X_{i-1}$ XOR $Y_{i-1}$).

At step 340, the bit values $X_i$ and $X_{i-1}$ may be obtained. For example, referring to FIG. 2, the LCA logic 130 may obtain the bit values $X_i$ and $X_{i-1}$ of the bit vector X. In some embodiments, the bits values $X_i$ and may be provided as inputs to the XNOR gate 242 included in the LCA logic 130.

At step 350, a mask bit corresponding to bit position i may be generated using the propagation values $P_{i+i}$, $P_i$, and $P_{i-1}$ and the bit values $X_i$ and $X_{i-i}$. In some embodiments, these values may be used as inputs to a mask bit formula. For example, as described above with reference to FIG. 2, the LCA logic 130 may generate a mask bit at bit position i based on the mask bit formula (derived above):

$$mb[i]=P[i] \text{ OR } !P[i-1] \text{ AND } (P[i+1] \text{ XOR } (X[i] \text{ XNOR } X[i-1])).$$

After step 350, the processing of the current bit position i is complete, and the sequence 300 returns to step 320 to begin processing the next bit position (i.e., the next iteration of bit position i from n−1 to 1). Once all bit positions have been processed at step 320 (i.e., when i=1), the sequence 300 continues at step 370. Note that, in some embodiments, the mask bits generated at step 350 through the iterations of this loop may form an LCA mask 135 (shown in FIG. 1B).

At step 370, a LCA mask (i.e., the mask bits generated at step 350 during the iterations of i=n−1 to 1) may be used to normalize the output of the addition-like floating point operation (i.e., the result of step 360). For example, referring to FIG. 1B, the shifter 170 may determine a shift number based on the number of "0" bits to the left of (i.e., at higher bit positions than) the first "1" bit (indicating the position of the MSB). The shifter 170 may then bit shift the output mantissa 165 to the left by the shift number to obtain a normalized output 175.

At step 380, the normalized output may be rounded. For example, referring to FIG. 1B, the rounder 180 may round the normalized output 175 to obtain the rounded output 185. After step 380, the sequence 300 ends.

Note that the examples shown in FIGS. 1A-1B, 2, and 3 are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of components other than those shown, and that different arrangement of the components shown may occur in certain implementations. Further, it is contemplated that specifics in the examples shown in FIGS. 1A-1B, 2, and 3 may be used anywhere in one or more embodiments.

Figure 4:
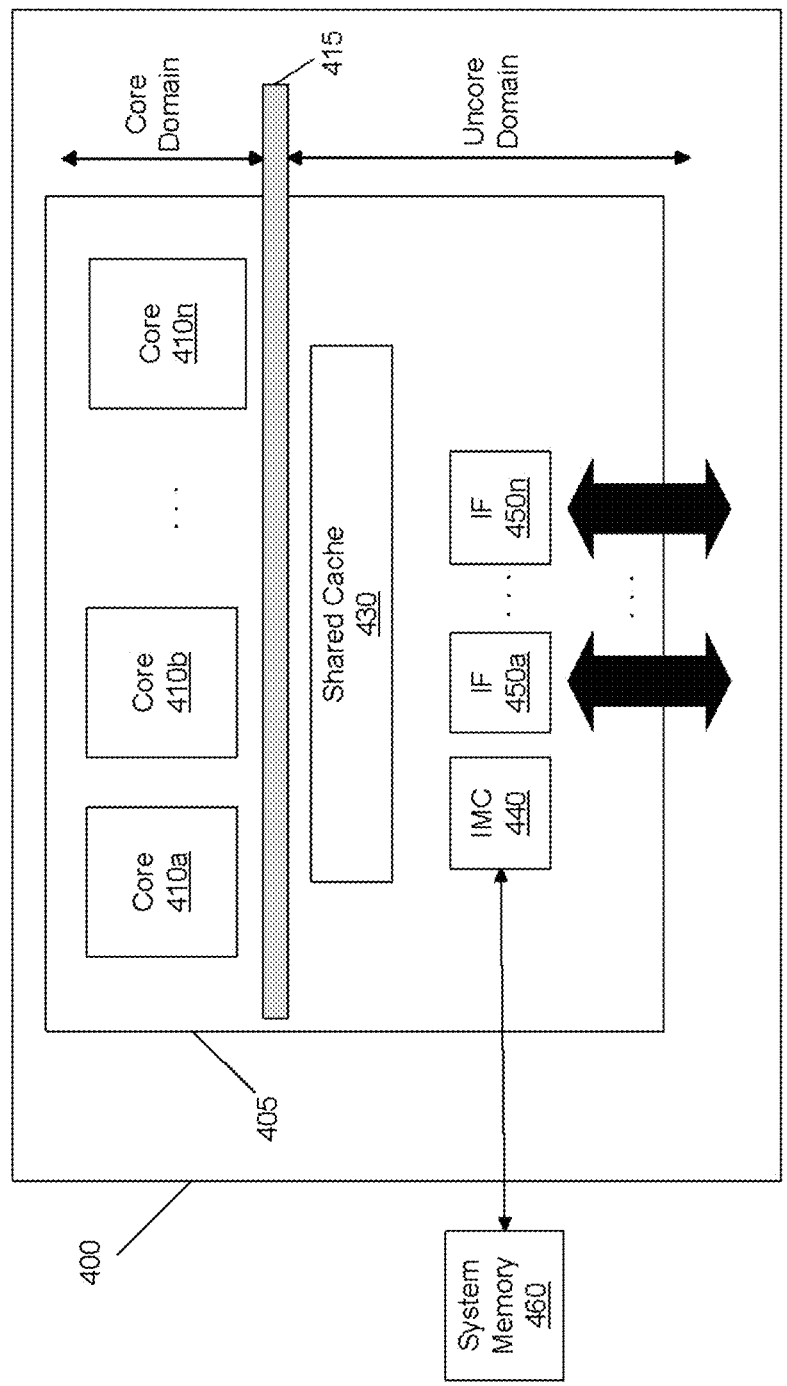
FIG. 4 is a block diagram of a processor in accordance with one or more embodiments.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440 and various interfaces 450.

Although not shown for ease of illustration in FIG. 4, in some embodiments, each of the cores 410a-410n may include the LCA logic 130 shown in FIG. 1A. Alternatively, in some embodiments, some or all of the LCA logic 130 may be included in the uncore domain 420, and may thus be shared across the cores 410a-410n.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
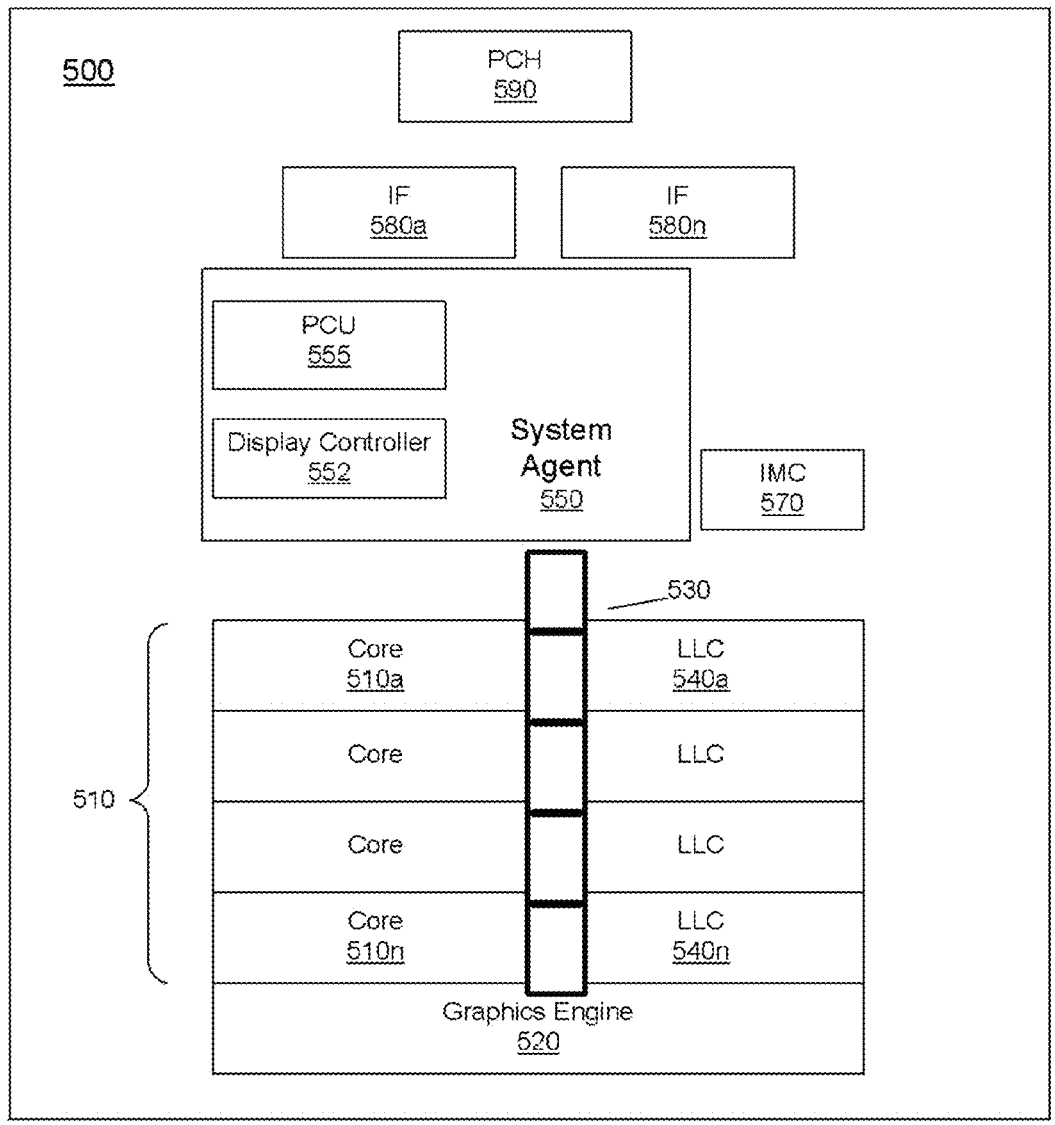
FIG. 5 is a block diagram of a multi-domain processor in accordance with one or more embodiments.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Although not shown for ease of illustration in FIG. 5, in some embodiments, each of the cores 510a-510n can include the LCA logic 130 described above with reference to FIG. 1A. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, understand the scope of the present invention is not limited in this regard.

Figure 6:
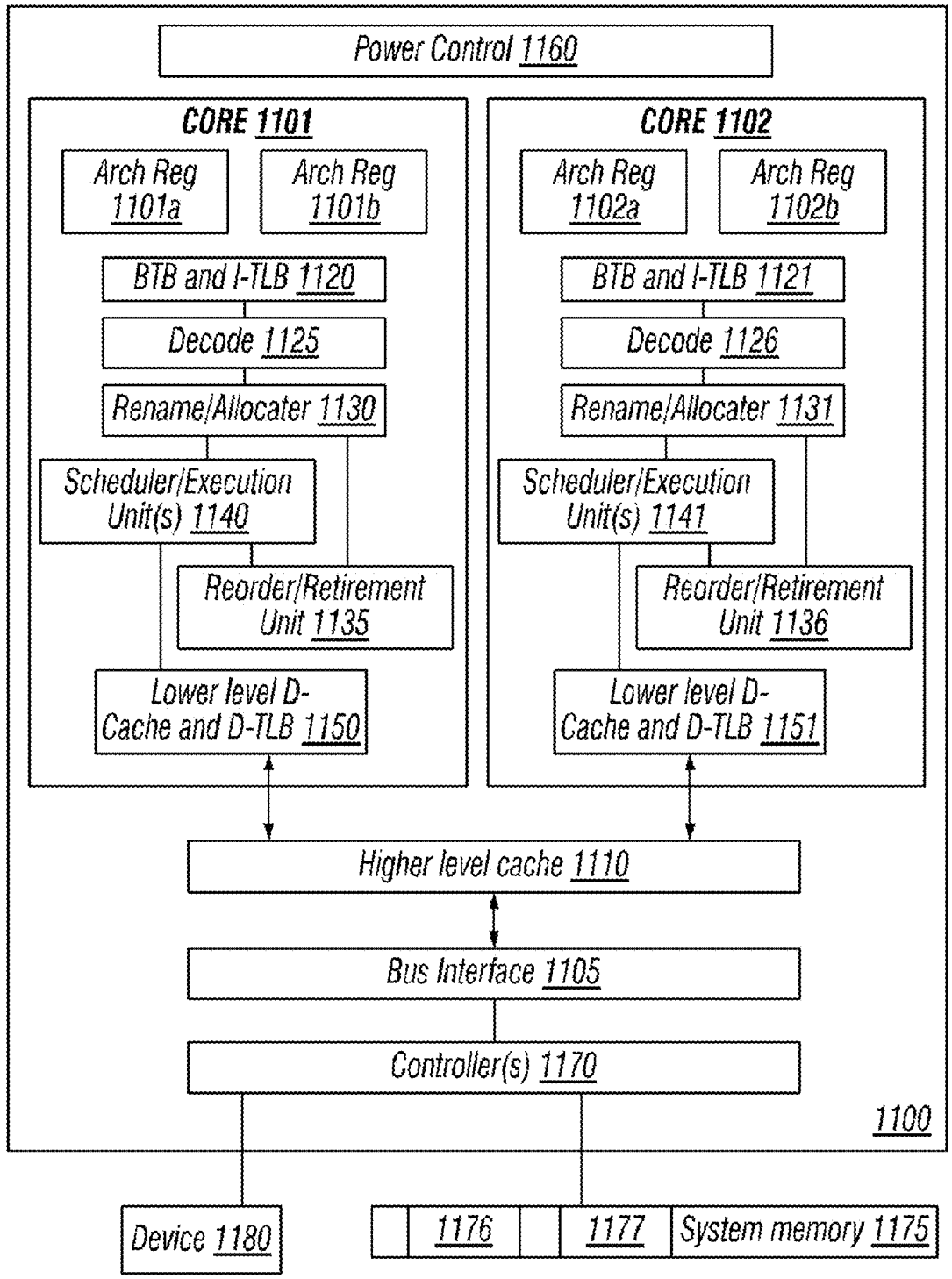
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 can include the LCA logic 130 described above with reference to FIG. 1A.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above.

As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., one or more of the actions shown in FIG. 3). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
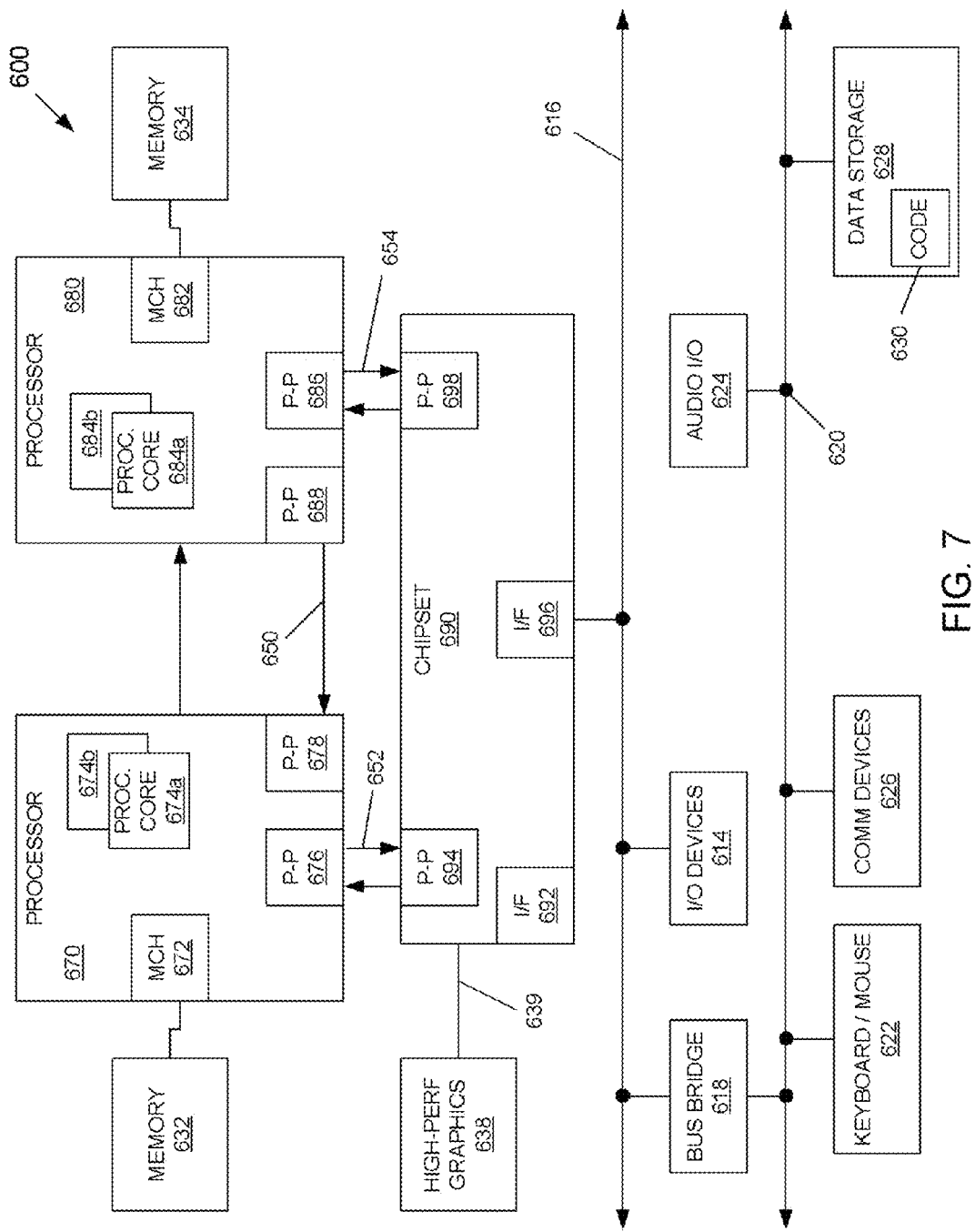
FIG. 7 is a block diagram of a system in accordance with one or more embodiments.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of these processors can include any part of the LCA logic 130 described above with reference to FIG. 1A.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 8:
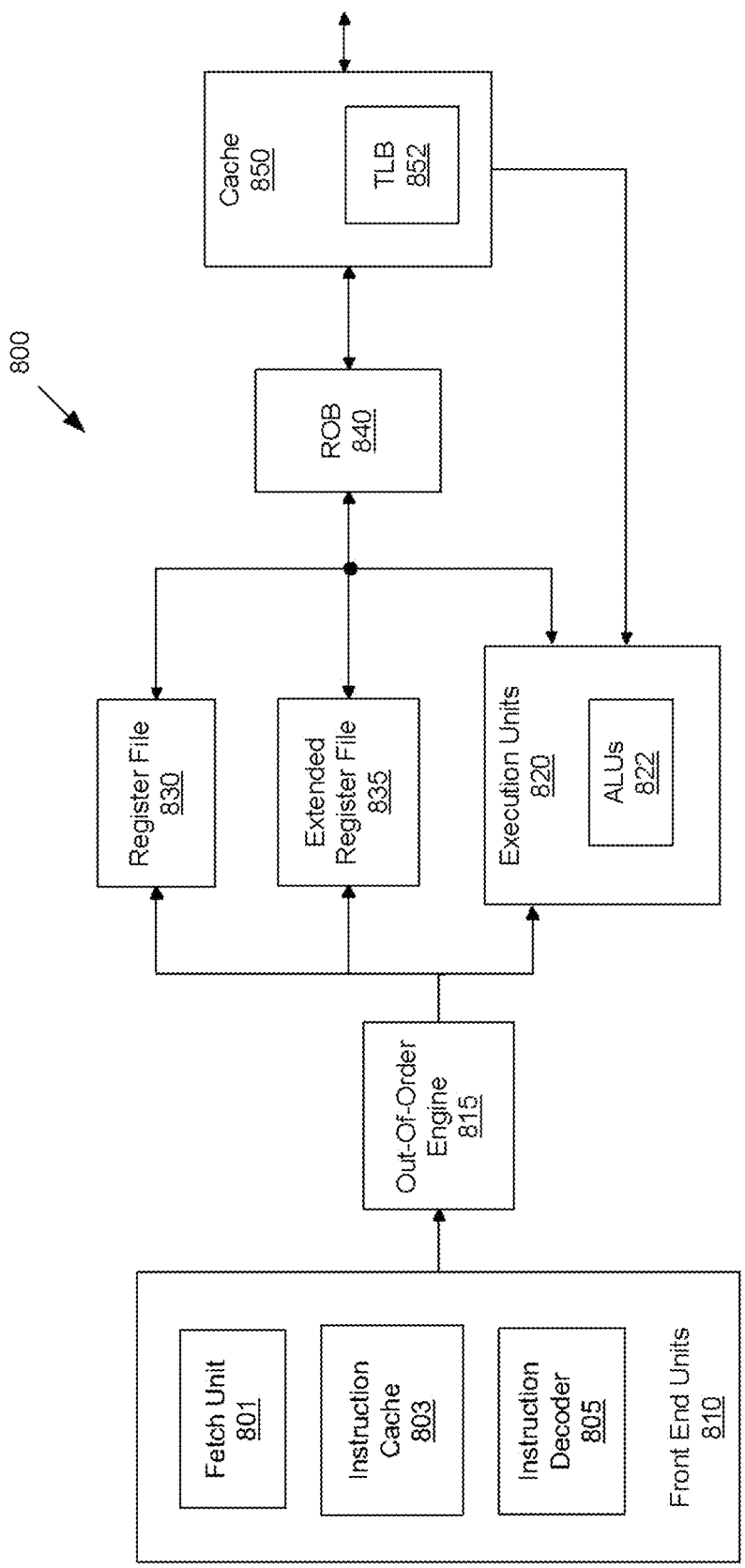
FIG. 8 is a block diagram of a system in accordance with one or more embodiments.

Referring now to FIG. 8, shown is a block diagram of a processor core 800 in accordance with one embodiment of the present invention. As shown, processor core 800 may be a multi-stage pipelined out-of-order processor. Processor core 800 is shown with a relatively simplified view in FIG. 8 to illustrate various features used in connection with a FMA unit in accordance with an embodiment of the present invention.

As shown in FIG. 8, core 800 includes front end units 810, which may be used to fetch instructions to be executed and prepare them for use later in the processor. For example, front end units 810 may include a fetch unit 801, an instruction cache 803, and an instruction decoder 805. In some implementations, front end units 810 may further include a trace cache, along with microcode storage as well as a micro-operation storage. Fetch unit 801 may fetch macro-instructions, e.g., from memory or instruction cache 803, and feed them to instruction decoder 805 to decode them into primitives such as micro-operations for execution by the processor.

Coupled between front end units 810 and execution units 820 is an out-of-order (OOO) engine 815 that may be used to receive the micro-instructions and prepare them for execution. More specifically OOO engine 815 may include various buffers to re-order micro-instruction flow and allocate various resources needed for execution, as well as to provide renaming of logical registers onto storage locations within various register files such as register file 830 and extended register file 835. Register file 830 may include separate register files for integer and floating point operations. Extended register file 835 may provide storage for vector-sized units, e.g., 256 or 512 bits per register.

Various resources may be present in execution units 820, including, for example, various integer, floating point, and single instruction multiple data (SIMD) logic units, among other specialized hardware. For example, the execution units 820 may include one or more arithmetic logic units (ALUs) 822. In various embodiments, one or more of the ALUs 822 may include the LCA logic 130 described above with reference to FIG. 1A.

When operations are performed on data within the execution units 820, results may be provided to retirement logic, namely a reorder buffer (ROB) 840. More specifically, ROB 840 may include various arrays and logic to receive information associated with instructions that are executed. This information is then examined by ROB 840 to determine whether the instructions can be validly retired and result data committed to the architectural state of the processor, or whether one or more exceptions occurred that prevent a proper retirement of the instructions. Of course, ROB 840 may handle other operations associated with retirement.

As shown in FIG. 8, ROB 840 is coupled to cache 850 which, in one embodiment may be a low level cache (e.g., an L1 cache) and which may also include a translation lookside buffer (TLB) 852, although the scope of the present invention is not limited in this regard. Also, execution units 820 can be directly coupled to cache 850. From cache 850, data communication may occur with higher level caches, system memory and so forth. Note that while the implementation of the processor of FIG. 8 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a processor including at least one floating point unit. The at least one floating point unit may include an adder, leading change anticipator (LCA) logic, and a shifter. The adder may be to add a first operand X and a second operand Y to obtain an output operand having a bit length n. The LCA logic may be coupled to the adder, and may be to: for each bit position i from n−1 to 1 of the output operand, obtain a set of bit values of the first operand X, and obtain a set of propagation values based on the first operand X and the second operand Y; and generate a LCA mask based on the set of propagation values and the set of bit values. The shifter may be coupled to the adder and the LCA logic, and may be to normalize the output operand based on the LCA mask. The LCA logic may include an exclusive-NOR (XNOR) gate, an exclusive-OR (XOR) gate, an AND gate, and an OR gate, where the XOR gate is coupled to the adder and an output of the XNOR gate, where the AND gate is coupled to the adder and an output of the XOR gate, and where the OR gate is coupled to the adder and an output of the AND gate. The set of bit values may include a first bit value $X_i$ and a second bit value $X_{i-1}$ of the first operand X, where the XNOR gate may be to receive the first bit value $X_i$ and the second bit value $X_{i-1}$ as inputs. The set of propagation values may include a first propagation value $P_i$ corresponding to $X_i$ XOR $Y_i$, a second propagation value $P_{i+1}$ corresponding to the value $X_{i+1}$ XOR $Y_{i+1}$, and a third propagation value $P_i-1$ corresponding to the value $X_{i-1}$ XOR $Y_{i-1}$. The XOR gate may be to receive the second propagation value $P_{i+1}$ as an input from the adder, where the AND gate is to receive an inverse of the third propagation value $P_{i-1}$ as an input from the adder, and where the OR gate is to receive the first propagation value $P_i$ as an input from the adder. The LCA logic may be to operate in parallel to the adder, where the shifter is to receive the LCA mask at a first point in time, where the shifter is to receive the output operand at a second point in time, and where the first point in time is equal to or earlier than the second point in time. The LCA mask may include, for each leading one or zero in the output operand, a first value bit. The LCA mask may also include a second value bit in a bit position corresponding to a most significant bit (MSB) of the output operand. The shifter may be to determine a shift length based on the bit position of the MSB of the output operand, where the shifter is to obtain a normalized output operand by bit shifting the output operand by the shift length. The at least one floating point unit may also include a rounder to round the normalized output operand obtained by the shifter.

Another example embodiment may be a system including one or more hardware processors coupled to a memory. Each of the one or more hardware processors may include at least one addition unit. The at least one addition unit may include an adder and leading change anticipator (LCA) logic. The adder may be to add a first mantissa X and a second mantissa Y to obtain an output mantissa having a bit length n. The LCA logic may be to, for each bit position i from n−1 to 1: obtain a first propagation value $P_i$, a second propagation value $P_{i+1}$, and a third propagation value $P_{i-1}$ based on the first mantissa X and the second mantissa Y; obtain a first bit value $X_i$ and a second bit value of the first mantissa X; and generate a mask bit based on the first propagation value $P_i$, the second propagation value $P_{i+1}$, the third propagation value $P_{i-1}$, the first bit value $X_i$, and the second bit value $X_{i-1}$. The at least one addition unit may be a fused multiply-add (FMA) execution unit. The at least one addition unit may also include a shifter to: determine a shift length based on a highest mask bit having a zero value; and bit shift the output mantissa to the left by the shift length to obtain a normalized output mantissa. The at least one addition unit may also include a rounder to round the normalized output mantissa. The LCA logic may include an exclusive-NOR (XNOR) gate to receive the first bit value $X_i$, and the second bit value $X_{i-1}$ as inputs.

Yet another example embodiment may be a method, including adding, by an adder circuit, a first bit vector X and a second bit vector Y to obtain an output bit vector having a bit length n. The method also includes, for each bit position i from n−1 to 1: obtaining, by leading change anticipator (LCA) logic, a plurality of propagation values P from the adder; obtaining, by the LCA logic, a first bit value $X_i$ and a second bit value $X_{i-1}$ of the first bit vector X; and generating a mask bit based on the plurality of propagation values P, the first bit value $X_i$, and the second bit value $X_{i-1}$. The method also includes determining a shift length using at least some of the mask bits generated for each bit position i from n−1 to 1 of the output bit vector. The method may further include bit shifting the output bit vector to the left by the shift length to obtain a normalized output bit vector. The method may further include rounding the normalized output bit vector. Generating the mask bits for each bit position i from n−1 to 1 may include: generating a first value bit for each leading one or zero, and generating a second value bit for a most significant bit (MSB). The method may further include providing the first bit value $X_i$, and the second bit value as inputs to an exclusive-NOR (XNOR) gate included in the LCA logic. The method may further include generating, by the LCA logic, a LCA mask based on the mask bits for each bit position i from n−1 to 1. Adding the first bit vector X and the second bit vector Y may be performed in parallel to generating the LCA mask. Generating the LCA mask may be completed prior to completing the adding of the first bit vector X and the second bit vector Y.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
   at least one floating point unit, including:
      an adder to add a first operand X and a second operand Y to obtain an output operand having a bit length n;
      a leading change anticipator (LCA) logic, coupled to the adder, to:
         for each bit position i from n−1 to 1 of the output operand, obtain a set of bit values of the first operand X, and obtain a set of propagation values based on the first operand X and the second operand Y; and
         generate a LCA mask based on the set of propagation values and the set of bit values; and
      a shifter, coupled to the adder and the LCA logic, to normalize the output operand based on the LCA mask,
      wherein the adder, the LCA logic, and the shifter are implemented at least in part in hardware.

2. The processor of claim 1, wherein the LCA logic comprises an exclusive-NOR (XNOR) gate, an exclusive-OR (XOR) gate, an AND gate, and an OR gate, wherein the XOR gate is coupled to the adder and an output of the XNOR gate, wherein the AND gate is coupled to the adder and an output of the XOR gate, and wherein the OR gate is coupled to the adder and an output of the AND gate.

3. The processor of claim 2, wherein the set of bit values comprises a first bit value $X_i$ and a second bit value $X_{i-1}$ of the first operand X, and wherein the XNOR gate is to receive the first bit value $X_i$ and the second bit value $X_{i-1}$ as inputs.

4. The processor of claim 1, wherein the set of propagation values comprises a first propagation value $P_i$ corresponding to $X_i$ XOR $Y_i$, a second propagation value $P_{i+1}$ corresponding to the value $X_{i+1}$ XOR $Y_{i+1}$, and a third propagation value $P_{i-1}$ corresponding to the value $X_{i-1}$ XOR $Y_{i-1}$.

5. The processor of claim 4, wherein the XOR gate is to receive the second propagation value $P_{i+1}$ as an input from the adder, wherein the AND gate is to receive an inverse of the third propagation value $P_{i-1}$ as an input from the adder, and wherein the OR gate is to receive the first propagation value $P_i$ as an input from the adder.

6. The processor of claim 1, wherein the LCA logic is to operate in parallel to the adder, wherein the shifter is to receive the LCA mask at a first point in time, wherein the shifter is to receive the output operand at a second point in time, and wherein the first point in time is equal to or earlier than the second point in time.

7. The processor of claim 1, wherein the LCA mask comprises, for each leading one or zero in the output operand, a first value bit.

8. The processor of claim 7, wherein the LCA mask further comprises a second value bit in a bit position corresponding to a most significant bit (MSB) of the output operand.

9. The processor of claim 8, wherein the shifter is to determine a shift length based on the bit position of the MSB of the output operand, and wherein the shifter is to obtain a normalized output operand by bit shifting the output operand by the shift length.

10. The processor of claim 9, wherein the at least one floating point unit further comprises a rounder to round the normalized output operand obtained by the shifter.

11. A system comprising:
one or more hardware processors, each including:
at least one addition unit including:
an adder to add a first mantissa X and a second mantissa Y to obtain an output mantissa having a bit length n;
leading change anticipator (LCA) logic to, for each bit position i from n−1 to 1:
obtain a first propagation value $P_i$, a second propagation value $P_{i+1}$, and a third propagation value $P_{i-1}$ based on the first mantissa X and the second mantissa Y;
obtain a first bit value $X_i$ and a second bit value $X_{i-1}$ of the first mantissa X; and
generate a mask bit based on the first propagation value $P_i$, the second propagation value $P_{i+1}$, the third propagation value $P_{i-1}$, the first bit value $X_i$, and the second bit value $X_{i-1}$; and
a memory coupled to the one or more hardware processors.

12. The system of claim 11, wherein the at least one addition unit is a fused multiply-add (FMA) execution unit.

13. The system of claim 11, wherein the at least one addition unit further includes a shifter to:
determine a shift length based on a highest mask bit having a zero value; and
bit shift the output mantissa to the left by the shift length to obtain a normalized output mantissa.

14. The system of claim 13, wherein the at least one addition unit further includes a rounder to round the normalized output mantissa.

15. The system of claim 11, wherein the LCA logic comprises an exclusive-NOR (XNOR) gate to receive the first bit value $X_i$, and the second bit value $X_{i-1}$ as inputs.

16. A method, comprising:
adding, by an adder circuit, a first bit vector X and a second bit vector Y to obtain an output bit vector having a bit length n;
for each bit position i from n−1 to 1 of the output bit vector:
obtaining, by leading change anticipator (LCA) logic, a plurality of propagation values P from the adder;
obtaining, by the LCA logic, a first bit value $X_i$ and a second bit value $X_{i-1}$ of the first bit vector X; and
generating a mask bit based on the plurality of propagation values P, the first bit value $X_i$, and the second bit value $X_{i-1}$; and
determining a shift length using at least some of the mask bits generated for each bit position i from n−1 to 1, wherein the LCA logic is implemented at least in part in hardware.

17. The method of claim 16, further comprising bit shifting the output bit vector to the left by the shift length to obtain a normalized output bit vector.

18. The method of claim 17, further comprising rounding the normalized output bit vector.

19. The method of claim 16, wherein generating the mask bits for each bit position i from n−1 to 1 comprises:
generating a first value bit for each leading one or zero; and
generating a second value bit for a most significant bit (MSB).

20. The method of claim 16, further comprising providing the first bit value $X_i$, and the second bit value $X_{i-1}$ as inputs to an exclusive-NOR (XNOR) gate included in the LCA logic.

21. The method of claim 16, further comprising generating, by the LCA logic, a LCA mask based on the mask bits for each bit position i from n−1 to 1.

22. The method of claim 21, wherein adding the first bit vector X and the second bit vector Y is performed in parallel to generating the LCA mask.

23. The method of claim 22, wherein generating the LCA mask is completed prior to completing the adding of the first bit vector X and the second bit vector Y.

* * * * *